United States Patent
Ogawa (10) Patent No.: US 8,045,015 B2
(45) Date of Patent: Oct. 25, 2011

(54) IMAGE PICKUP APPARATUS, WHITE BALANCE CONTROL METHOD THEREOF, AND STORAGE MEDIUM

(75) Inventor: Shigeo Ogawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 589 days.

(21) Appl. No.: 12/186,035

(22) Filed: Aug. 5, 2008

(65) Prior Publication Data

US 2009/0040334 A1     Feb. 12, 2009

(30) Foreign Application Priority Data

Aug. 8, 2007   (JP) .................................. 2007-207027

(51) Int. Cl.
*H04N 9/73*   (2006.01)
(52) U.S. Cl. ..................................................... 348/223.1
(58) Field of Classification Search ........................ None
See application file for complete search history.

(56) References Cited

U.S. PATENT DOCUMENTS

| | | | | |
|---|---|---|---|---|
| 5,319,449 A * | 6/1994 | Saito et al. | ................. | 348/223.1 |
| 6,522,353 B1 * | 2/2003 | Saito et al. | ................. | 348/223.1 |
| 6,968,118 B1 | 11/2005 | Yamagishi et al. | | |
| 2003/0112342 A1 * | 6/2003 | Takeuchi | ................... | 348/223.1 |
| 2004/0012690 A1 | 1/2004 | Makioka | | |
| 2004/0212691 A1 * | 10/2004 | Sato | ........................ | 348/223.1 |
| 2004/0246348 A1 * | 12/2004 | Takeshita | ................... | 348/223.1 |
| 2007/0024719 A1 * | 2/2007 | Sakurai | ..................... | 348/223.1 |
| 2007/0132858 A1 * | 6/2007 | Chiba et al. | ................ | 348/222.1 |
| 2007/0159536 A1 * | 7/2007 | Lin | ............................ | 348/223.1 |

FOREIGN PATENT DOCUMENTS

| | | |
|---|---|---|
| JP | 11-261933 A | 9/1999 |
| JP | 2001-223979 A | 8/2001 |
| JP | 2003-324746 A | 11/2003 |

* cited by examiner

*Primary Examiner* — Albert H Cutler
*Assistant Examiner* — Albert Cutler
(74) *Attorney, Agent, or Firm* — Rossi, Kimms & McDowell LLP (57) ABSTRACT

An image pickup apparatus capable of, when adjusting the white balance in development processing, eliminating the need for performing integration processing and calculation processing for white balance adjustment even when white balance is set to an arbitrary mode, thereby significantly reducing the processing time. In the image pickup apparatus, a calculation unit is adapted to, in a case where an integration parameter to be set in an integration unit is identical with or close to an integration parameter stored in a storage unit, calculate a white balance control value using a white balance integration value read out from the storage unit, without performing calculation processing using a white balance integration value acquired by an integration unit.

12 Claims, 8 Drawing Sheets

| | | 501 |
|---|---|---|
| 0 ; BLOCK INTEGRATION VALUE | | |
| 1 ; AUTO | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 2 ; SUNLIGHT | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 3 ; CLOUDY | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 4 ; ELECTRIC BULB | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 5 ; FLUORESCENT | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 6 ; FLUORESCENT H | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 7 ; UNDERWATER | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |
| 8 ; STROBE LIGHT | WB INTEGRATION EXECUTION FLAG | |
| | INTEGRATION PARAMETER | |
| | WHITE SEARCH INTEGRATION VALUE | |
| | WB CALCULATION RESULT | |
| | WB OPERATION EXECUTION FLAG | |

IMAGE PICKUP APPARATUS, WHITE BALANCE CONTROL METHOD THEREOF, AND STORAGE MEDIUM

BACKGROUND OF THE INVENTION

1. Field of the Invention

The present invention relates to an image pickup apparatus having a plurality of white balance modes, and a white balance control method thereof, and a storage medium.

2. Description of the Related Art

Digital cameras are conventionally known which is capable of outputting a video signal of the digital camera as it is (see Japanese Laid-Open Patent Publication (Kokai) No. 11-261933 and Japanese Laid-Open Patent Publication (Kokai) No. 2001-223979). Utilizing image data of a video signal as it is (hereunder, referred to as "the raw data") is utilized enables image correction processing to be expected after photographing.

Since the raw data is image data of a video signal as it is, the raw data can be converted into commonly handled image data such as JPEG format data by performing image processing (hereunder, referred to as "the development") on the raw data. A function of adjusting the white balance is one kind of image correction processing for the raw data. With this function, it is possible to switch a white balance mode after photographing to obtain image data having the appropriate color tones.

Technology is also known of improving the accuracy of white balance adjustment when a white balance mode is switched by storing information that shows a shift in a blackbody locus in the raw data (see Japanese Laid-Open Patent Publication (Kokai) No. 2003-324746).

However, there is the following problem with the conventional image pickup apparatus described above. That is, when setting a white balance (WB) mode to perform correction processing for color tones, it is necessary to perform integration processing for video signals included in the raw data and also perform WB calculation processing utilizing an integration value that is obtained by the integration processing.

Conventionally, when performing this processing and switching among a plurality of white balance settings to view changes in color tones, there is a problem that it is necessary to execute the aforementioned integration processing and calculation processing for each white balance mode, to require substantial processing time.

Further, the amount of data in video signals is increasing because of the increasing numbers of pixels in images captured by image pickup devices in recent years. As a result, the processing times required for integration processing and calculation processing are steadily increasing.

Furthermore, with respect to image pickup apparatuses having a function of capturing an image as the raw data, when image data subjected to the development processing at the image pickup apparatus main unit is compared with image data obtained after subjecting the raw data to the development processing on a PC or the like after photographing, the processing and the results relating to white balance adjustment are not the same. As a result, there is a problem that the color reproduction properties deteriorate.

SUMMARY OF THE INVENTION

The present invention provides an image pickup apparatus capable of, when adjusting the white balance in development processing, eliminating the need for performing integration processing and calculation processing for white balance adjustment even when white balance is set to an arbitrary mode, thereby enabling a significant reduction in processing time, as well as a white balance control method thereof, a program, and a storage medium.

In a first aspect of the present invention, there is provided with an image pickup apparatus having a plurality of white balance modes, comprising: an image pickup unit adapted to capture images of a subject to obtain a video signal; an integration unit adapted to perform integration processing of the video signal obtained by the image pickup unit, based on an integration parameter set by a setting unit, to acquire a white balance integration value for each of the white balance modes; a calculation unit adapted to perform calculation processing using the white balance integration value acquired by the integration unit to calculate a white balance control value for correcting a color temperature of a light source; a storage unit adapted to store, for each of the white balance modes, the integration parameter set in the integration unit, the white balance integration value corresponding to the set integration parameter, acquired by the integration unit, and the white balance control value calculated by the calculation unit; a comparison unit adapted to compare an integration parameter to be set in the integration unit with the integration parameter stored in the storage unit; and a readout unit adapted to, in a case where a result of the comparison indicates that an integration parameter to be set in the integration unit is identical with or close to the integration parameter stored in the storage unit, read out the white balance integration value corresponding to the integration parameter from the storage unit, wherein the calculation unit is adapted to, in a case where a result of the comparison indicates that an integration parameter to be set in the integration unit is identical with or close to the integration parameter stored in the storage unit, calculate the white balance control value using the read out white balance integration value, without performing calculation processing using the white balance integration value acquired by the integration unit In a second aspect of the present invention, there is provided with a white balance control method of an image pickup apparatus having a plurality of white balance modes, comprising: an image pickup step of capturing images of a subject to obtain a video signal; an integration step of performing integration processing of the video signal obtained in the image pickup step, based on an integration parameter set in a setting step, to acquire a white balance integration value for each of the white balance modes; a calculation step of performing calculation processing using the white balance integration value acquired in the integration step to calculate a white balance control value for correcting a color temperature of a light source; a storage step of storing, for each of the white balance modes, the integration parameter set in the integration step, the white balance integration value corresponding to the set integration parameter, acquired in the integration step, and the white balance control value calculated in the calculation step; a comparison step of comparing an integration parameter to be set in the integration step with the integration parameter stored in the storage step; and a readout step of, in a case where a result of the comparison indicates that an integration parameter to be set in the integration step is identical with or close to the integration parameter stored in the storage step, reading out the white balance integration value corresponding to the integration parameter store in the storage step, wherein the calculation step comprises, in a case where a result of the comparison indicates that an integration parameter to be set in the integration step is identical with or close to the integration parameter stored in the storage step, calculating the white balance control value using the read out white balance integration value, without performing calculation processing using the white balance integration value acquired is the integration step.

In a third aspect of the present invention, there is provided with a computer-readable storage medium that stores a program causing a computer to execute a white balance control method of an image pickup apparatus having a plurality of white balance modes, the white balance control method comprising: an image pickup step of capturing images of a subject to obtain a video signal; an integration step of performing integration processing of the video signal obtained in the image pickup step, based on an integration parameter set in a setting step, to acquire a white balance integration value for each of the white balance modes; a calculation step of performing calculation processing using the white balance integration value acquired in the integration step to calculate a white balance control value for correcting a color temperature of a light source; a storage step of storing, for each of the white balance modes, the integration parameter set in the integration step, the white balance integration value corresponding to the set integration parameter, acquired in the integration step, and the white balance control value calculated in the calculation step; a comparison step of comparing an integration parameter to be set in the integration step with the integration parameter stored in the storage step; and a readout step of, in a case where a result of the comparison indicates that an integration parameter to be set in the integration step is identical with or close to the integration parameter stored in the storage step, reading out the white balance integration value corresponding to the integration parameter store in the storage step, wherein the calculation step comprises, in a case where a result of the comparison indicates that an integration parameter to be set in the integration step is identical with or close to the integration parameter stored in the storage step, calculating the white balance control value using the read out white balance integration value, without performing calculation processing using the white balance integration value acquired is the integration step.

According to the present invention, a white balance integration value is obtained for each of the white balance modes, the calculation processing is performed using the obtained white balance integration values to calculate a white balance control value, and the integration processing is omitted when the integration parameters are identical with or close to each other. Therefore, it is possible to, when adjusting the white balance in the development processing, eliminating the need for performing the integration processing and the calculation processing for the white balance adjustment even if the white balance is set to an arbitrary mode to significantly reduce in the processing time.

Further, since it is not necessary to perform the integration processing and the calculation processing for the white balance adjustment in the development processing of the image data (raw data), thereby reducing the overall circuit scale of the development processing or the size of the program code, which simplifies the configuration.

Furthermore, when image data subjected to the development processing at the image pickup apparatus main unit is compared with image data obtained by the development processing of the raw data on a PC or the like after photographing, the processing and the results relating to the white balance adjustment can be made the same, thereby improving the color reproduction properties.

According to the present invention, since the white search integration is executed for each of the white balance modes and the block integration is executed each time photographing is performed, it is possible to accurately calculate an integration value for the white balance adjustment. Further, according to the present invention, since the storage unit has a storage region that holds a single integration value obtained by the block integration, it is possible to commonly use an integration value obtained by the block integration for a plurality of the white balance modes. According to the present invention, it is possible to easily perform setting of the integration parameter.

According to the present invention, since the integration processing and the calculation processing are executed concurrently, it is possible to reduce a processing time. Further, according to the present invention, since the calculation processing is executed concurrently during the development processing, it is possible to reduce the overall processing time. Furthermore, according to the present invention, since the integration processing and the calculation processing are repeatedly executed, it is possible to correspond to all the white balance modes.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
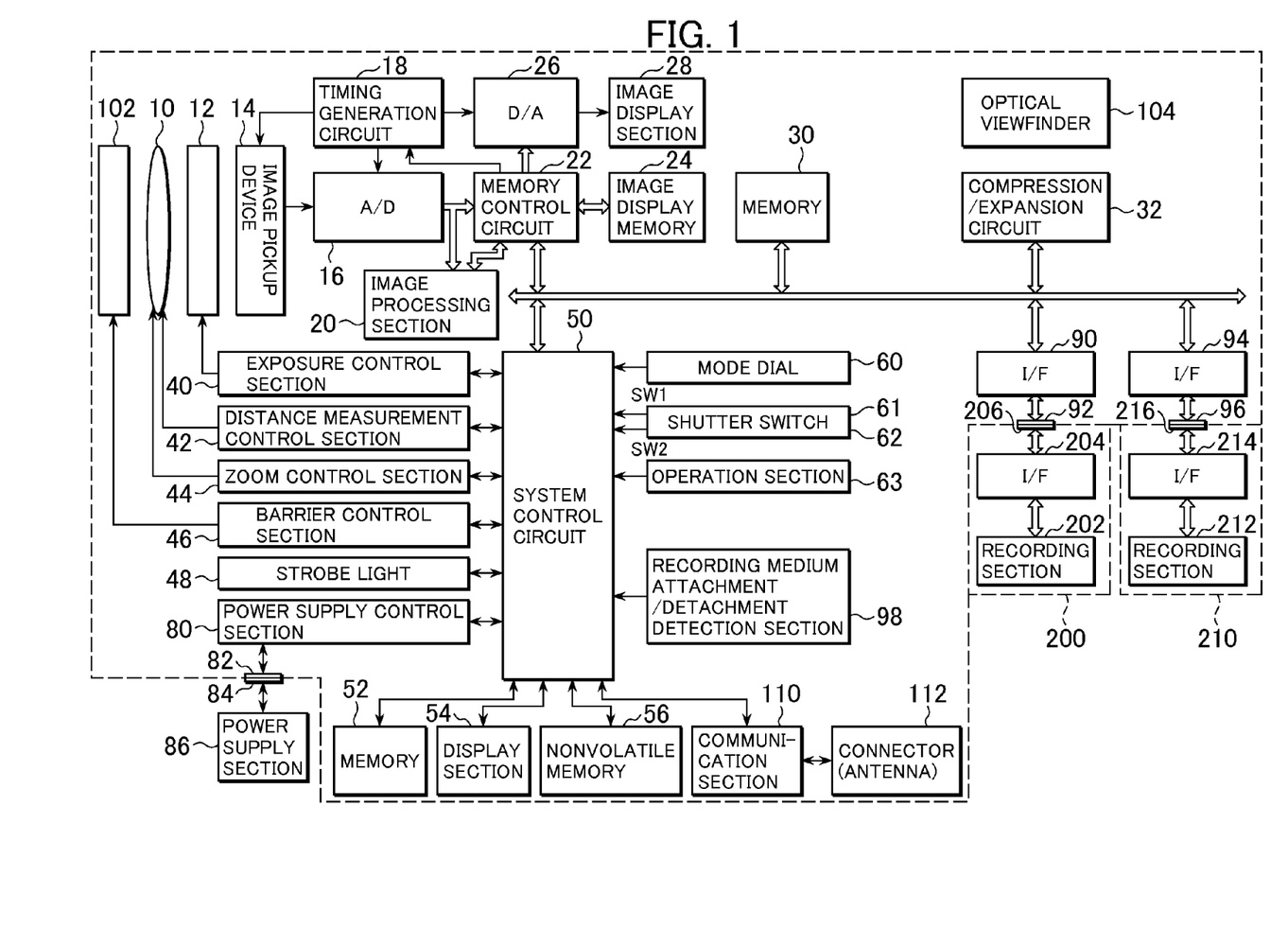
FIG. 1 is a view showing a configuration of an image pickup apparatus according to an embodiment of the present invention.

FIG. 1 is a view showing a configuration of an image pickup apparatus according to an embodiment of the present invention.

An image pickup apparatus 100 is provided with a photographing lens 10, a shutter 12 having a diaphragm function, an image pickup device 14 that converts an optical image into an electrical signal, and an A/D converter 16 that converts an analog signal output of the image pickup device 14 into a digital signal. The image pickup apparatus 100 has an image processing function.

A timing generation circuit 18 supplies a clock signal and a control signal to the image pickup device 14, the A/D converter 16, and a D/A converter 26. The timing generation circuit 18 is controlled by a memory control circuit 22 and a system control circuit 50.

An image processing circuit 20 performs predetermined pixel interpolation processing and color conversion processing on data supplied from the A/D converter 16 or the memory control circuit 22. The image processing circuit 20 also performs predetermined calculation processing using image data obtained by imaging. The system control circuit 50 controls an exposure control section 40 and a distance measurement control section 42 based on the calculation processing results to execute a TTL (through-the-lens) AF (auto focus) process, an AE (auto exposure) process, and an EF (flash pre-emission) process.

The image processing circuit 20 also performs predetermined calculation processing using image data obtained by imaging, and executes a TTL AWB (auto white balance) process based on the obtained calculation processing results. The following processing is performed as calculation processing for white balance adjustment. That is, block integration that divides a video signal into a plurality of blocks and obtains an integration value of a color signal of each block, and white search integration that expands signal values for each pixel of a video signal on chromaticity coordinates and obtains integration values of color signals for a predetermined region represented by integration parameters are performed. The settings of an integration region on the chromaticity coordinates used for the white search integration are held inside the image processing circuit 20.

The memory control circuit 22 controls the A/D converter 16, the timing generation circuit 18, the image processing circuit 20, an image display memory 24, the D/A converter 26, a memory 30, and a compression/expansion circuit 32. Data output from the A/D converter 16 is written in the image display memory 24 or the memory 30 via the image processing circuit 20 and the memory control circuit 22 or directly via the memory control circuit 22.

The image pickup apparatus 100 is also provided with the image display memory 24, the D/A converter 26, and an image display section 28 comprising a TFT liquid crystal display (LCD) or the like. Image data for display that is written in the image display memory 24 is displayed on the image display section 28 via the D/A converter 26. An electronic view finder function can be implemented by successively displaying picked-up image data using the image display section 28. The image display section 28 can arbitrarily turn on/off its display in response to an instruction from the system control circuit 50. When the display is turned off, the power consumption of the image pickup apparatus 100 can be significantly reduced.

The memory 30 stores captured still images or dynamic images. The memory 30 has a storage capacity that is sufficient for storing a predetermined number of still images or for storing dynamic images for a predetermined time period. With this arrangement, even when performing continuous-exposure imaging or panoramic exposure imaging that continuously captures a plurality of still images, a large quantity of images can be written in the memory 30 at high speed. The memory 30 can also be used as a work area of the system control circuit 50.

The compression/expansion circuit 32 compresses/expands image data by adaptive discrete cosine transformation (ADCT) or the like. The compression/expansion circuit 32 reads an image stored in the memory 30, performs processing to compress or expand the read image, and writes the processed data in the memory 30.

The exposure control section 40 controls the shutter 12 with the diaphragm function. The exposure control section 40 also has a flash dimming function that is implemented in conjunction with a strobe light (flash) 48. The distance measurement control section 42 controls focusing of the photographing lens 10. A zoom control section 44 controls zooming of the photographing lens 10. A barrier control section 46 controls operations of a protection section 102 serving as a barrier.

The strobe light 48 has an AF auxiliary light projection function and the flash dimming function. The exposure control section 40 and the distance measurement control section 42 are controlled using a TTL system. Based on a result of computation of picked-up image data by the image processing circuit 20, the system control circuit 50 controls the exposure control section 40 and the distance measurement control section 42.

The system control circuit 50 controls the entire image pickup apparatus 100. The memory 52 stores constants, variables, programs, and the like for the operation of the system control circuit 50. The memory 52 also stores a program diagram that is used with AE. The program diagram is a table that defines the relation between a control value for a shutter speed and a diaphragm opening diameter with respect to an exposure value.

A display section 54 includes a speaker and a liquid crystal display apparatus or the like that display an operation state or a message or the like using characters, images, sounds or the like in accordance with the execution of a program by the system control circuit 50. The display section 54 is placed at one or a plurality of positions around the operation section of the image pickup apparatus 100 that are easy to see. For example, the display section 54 comprises a combination of an LCD or LEDs, tone generation elements and the like. Some functions of the display section 54 are placed within an optical viewfinder 104.

Among the display contents of the display section 54, the contents that are displayed on an LCD or the like include a single shot/continuous exposure indication, a self-timer indication, a compression ratio indication, an indication of the number of recording pixels, an indication of the number of recorded images, an indication of the remaining number of images that can be captured, a shutter speed indication, an aperture value indication, and an exposure correction indication. The display contents also include a flash indication, a red-eye suppression indication, a macro-imaging indication, a buzzer setting indication, a remaining clock battery level indication, a remaining battery level indication, an error indication, information indication using numerals of a plurality of digits, an indication of the attachment or detachment status of recording media 200 and 210, a communication I/F operation indication, and a date/time indication. Among the display contents of the display section 54, those displayed within the optical viewfinder 104 include, e.g., an in-focus indication, a camera shake alert indication, a flash charging indication, a shutter speed indication, an aperture value indication, and an exposure correction indication.

A nonvolatile memory 56 is an electrically erasable/recordable memory. An EEPROM or the like is used as the nonvolatile memory 56.

A mode dial switch 60, shutter switches 61 and 62, and an operation section 63 comprise an operation section (broad meaning) for inputting various operating instructions of the system control circuit 50. The mode dial switch 60, shutter switches 61 and 62, and operation section 63 are composed by, for example, a switch, a dial, a touch panel, a pointing device by line-of-sight detection, a voice recognition device, or a combination thereof. These operation sections will now be described in detail.

The mode dial switch 60 can switch various function modes such as power on/off, an automatic imaging mode, an imaging mode, a panoramic imaging mode, a reproduction mode, a multi-screen reproduction/erase mode, and a personal computer (PC) connection mode.

The shutter switch 61 (SW1) is turned on midway through an operation of a shutter button (not shown), and instructs the start of various operations such as AS (auto-focus) processing, AE (auto-exposure) processing, AWS (auto-white-balance) processing, and EF (flash pre-emission) processing. In contrast, the shutter switch 62 (SW2) is turned on upon completion of operation of the shutter button (not shown), and instructs the start of a series of processes including an exposure process, a development process, and a recording process. In the exposure process, a signal that is read out from the image pickup device 12 is written as image data in the memory 30 via the A/D converter 16 and memory control circuit 22. In the development process, processing is performed using computation results of the image processing circuit 20 and memory control circuit 22. In the recording process, image data is read out from the memory 30, the image data is compressed at the compression/expansion circuit 32, and the compressed image data is written on the recording media 200 or 210.

The operation section 63 comprises various buttons, a touch panel, and the like. The operation section 63 includes a menu button, a set button, a macro button, a multi-screen reproduction/new-page button, a flash setting button, and a single-photographing/successive-photographing/self-timer switching button. The operation section 63 further includes a menu movement + (plus) button, a menu movement – (minus) button, a reproduction image movement +(plus) button, a reproduction image – (minus) button, a photographing image quality selection button, an exposure correction button, and a date/time setting button.

A power supply control section 80 includes a battery detection circuit, a DC-DC converter, and a switching circuit for switching a block to be energized. The power supply control section 80 detects whether or not a battery is installed, the type of battery, and the remaining battery power, and controls the DC-DC converter based on the detection result and a command from the system control circuit 50, so that the necessary voltage is applied to each section, including the recording media, for the required period of time.

A connector 82 is provided in the image pickup apparatus 100. A power supply section 86 is connected to a connector 84 that is fitted to the connector 82. The power supply section 86 comprises a primary battery such as an alkali battery or a lithium battery, a secondary battery such as a NiCd battery, a NiMH battery or a Li Battery, an AC adapter, or the like.

The image pickup apparatus 100 is also provided with interfaces 90 and 94 that allow connection to recording media such as memory cards or hard disks, and includes connectors 92 and 96 for connecting with the aforementioned recording media, that are connected to the interfaces 90 and 94, respectively. A recording medium attachment/detachment detection section 98 detects whether or not the recording medium 200 or 210 is attached to the connector 92 or the connector 96.

According to the present embodiment, the interfaces and connectors for attaching the recording media are provided in pairs. However, the interfaces and connectors for attaching the recording media may also be provided singly or in an arbitrary number greater than two.

Interfaces and connectors according to different standards may also be used in combination. With respect to the interfaces and connectors, those complying with the standards of a PCMCIA card, a CF (compact flash (registered trademark)) card, and the like may be used.

When the interfaces 90 and 94 and the connectors 92 and 96 that are used comply with the standards for a PCMCIA card or a CF (compact flash (registered trademark)) card, transfer of management information is easily performed by connecting various communication cards. Examples of the various communication cards include a LAN card, a modem card, a USB card, an IEEE1394 card, a P1284 card, a SCSI card, and a PHS communication card. It is thereby possible to transfer image data and management information that is attached to the image data between the image pickup apparatus 100 and a computer or a peripheral device such as a printer.

The protection section 102 is a barrier that prevents an image pickup section including the lens 10 of the image pickup apparatus 100 from becoming dirty or damaged by covering the image pickup section. The optical viewfinder 104 enables imaging using only the optical viewfinder, without using the electronic viewfinder function implemented by the image display section 28. Further, some functions of the display section 54, for example, an in-focus indication, a camera shake alert indication, a flash charging indication, a shutter speed indication, an aperture value indication, an exposure correction indication, and the like are provided within the optical viewfinder 104.

A communication section 110 has various communication functions such as RS232C, USB, IEEE1394, P1284, SCSI, modem, LAN, and radio communication. A connector/antenna 112 is a connector that is used when connecting the image pickup apparatus 100 to another device via the communication section 110, or is an antenna in the case of radio communication.

The recording medium 200 is a memory card, a hard disk, or the like. The recording medium 200 includes a recording section 202 comprised of a semiconductor memory, a magnetic disk or the like, an interface 204 with the image pickup apparatus 100, and a connector 206 for connecting to the image pickup apparatus 100. The recording medium 210 is a memory card, a hard disk, or the like. The recording medium 210 includes a recording section 212 comprised of a semiconductor memory, a magnetic disk or the like, an interface 214 with the image pickup apparatus 100, and a connector 216 for connecting to the image pickup apparatus 100.

Figure 2:
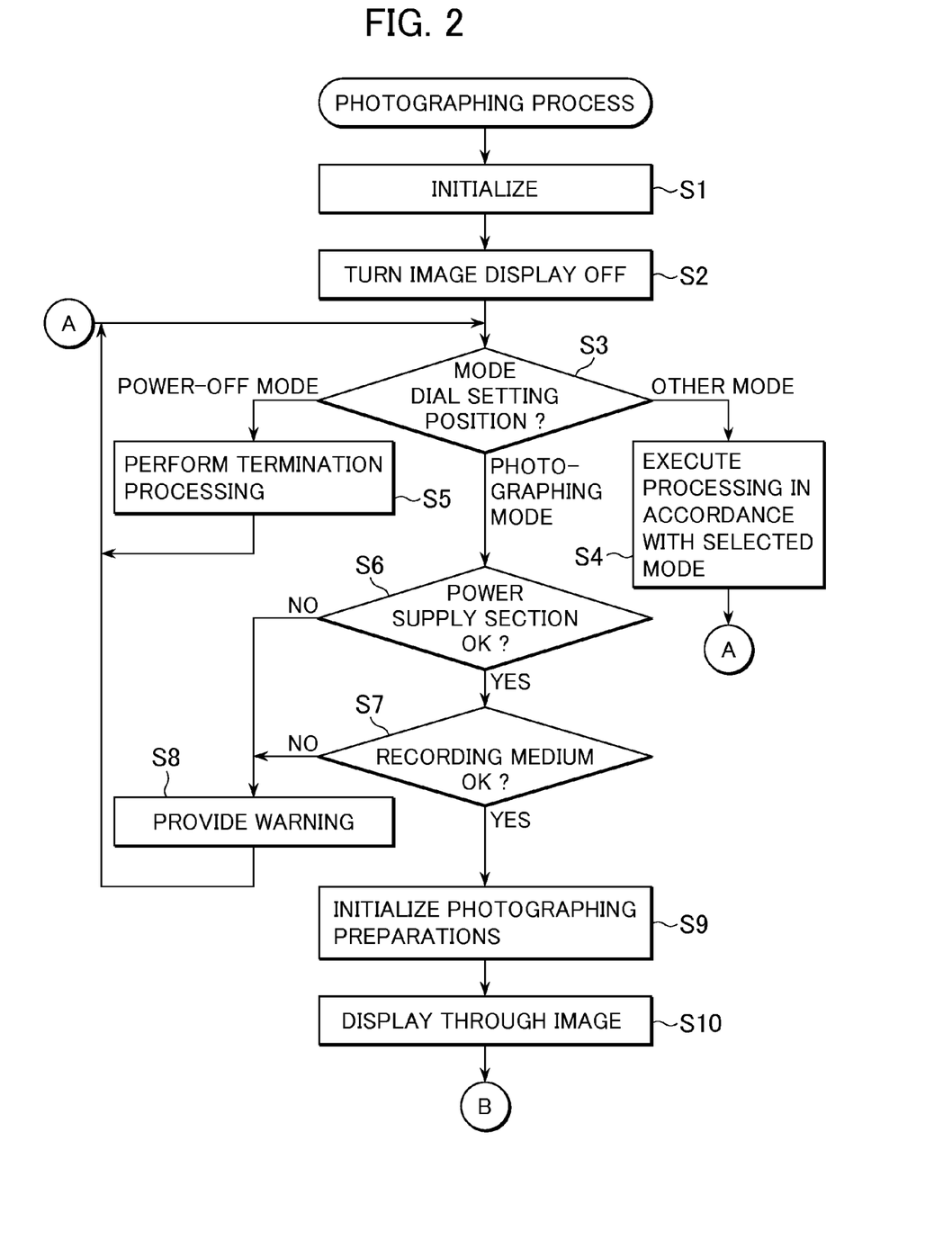
FIG. 2 is a flowchart showing the procedure of a photographing process executed by the image pickup apparatus shown in FIG. 1.
Figure 3:
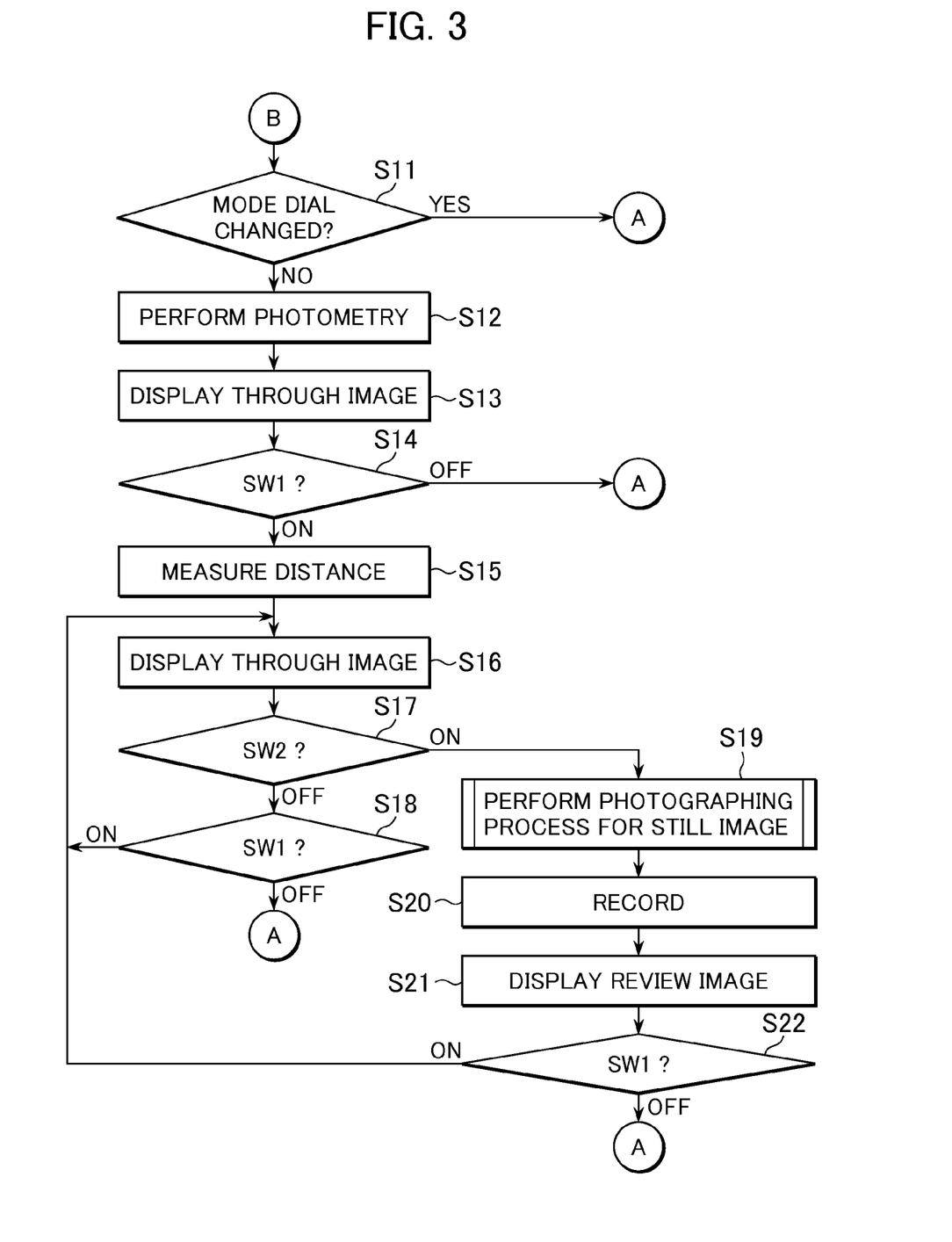
FIG. 3 is a flowchart showing the procedure of a photographing process executed by the image pickup apparatus shown in FIG. 1.

FIG. 2 and FIG. 3 are flowcharts showing the procedure of a photographing process executed by the image pickup apparatus shown in FIG. 1. This processing program is stored in the memory 52 and is executed by a CPU inside the system control circuit 50.

First, by power activation when, for example, a battery is replaced, the system control circuit 50 initializes a flag or a control variable or the like (step S1), and then sets the image display of the image display section 28 in an off state (initial state) (step S2).

The system control circuit 50 determines on which of the setting positions, namely, a power-off mode, a photographing mode, or a different mode, the mode dial 60 is (step S3). When the mode dial 60 is set to a power off mode, predetermined termination processing is executed (step S5), followed by the program returning to the step S3. The predetermined termination processing includes changing the display of each display section to a termination state, protecting the image pickup section by closing the barrier of the protection section 102, and recording required set values and parameters, including flags and control variables, and a setting mode in the nonvolatile memory 56. Further, an unnecessary power supply to each section of the image pickup apparatus 100 including the image display section 28 and the like is cut off by the power supply control section 80.

As a result of the determination of the step S3, if the mode dial 60 is set to a different mode, the system control circuit 50 executes processing according to the selected mode (step S4), followed by the program returning to the step S3.

Further, as a result of the determination of the step S3, if the mode dial 60 is set to a photographing mode, the system control circuit 50 uses the power supply control section 80 to determine whether or not the remaining amount of power and operating state of the power supply section 86 comprising a battery or the like constitute a problem with respect to the operation of the image pickup apparatus 100 (step S6). If there is a problem, the system control circuit 50 provides a predetermined warning by means of an image or sound using the display section 54 (step S8), followed by the program returning to the step S3.

In contrast, as a result of the determination of the step S6, if there is no problem with the power supply section S6, the system control circuit 50 determines whether or not the operation state of the recording medium 200 or the recording medium 210 constitutes a problem with respect to the operation of the image pickup apparatus 100, in particular, with respect to operations to record/reproduce image data to/from the recording medium (step S7). If there is a problem, the system control circuit 50 provides a predetermined warning by means of an image or sound using the display section 54 (step S8), followed by the program returning to the step S3.

In contrast, as a result of the determination of the step S7, if there is no problem with the operation state of the recording medium 200 or the recording medium 210, the system control circuit 50 initializes imaging preparations for displaying a through image on the image display section 28 (step S9). In this case, the term "through image" refers to dynamic images that are picked up by the image pickup device 14 for displaying as a finder function before and after capturing a still image.

Upon completing the imaging preparations, the system control circuit 50 starts displaying a through image on the image display section 28 (step S10). In the through image display state, data that is successively written to the image display memory 24 via the image pickup device 14, the A/D converter 16, the image processing circuit 20, and the memory control circuit 22 is successively displayed on the image display section 28 via the memory control circuit 22 and the D/A converter 26. Thus, the electronic finder function is implemented.

Next, the camera operations at the time of capturing a still image in a through image display state will be described. The system control circuit 50 determines whether or not the mode dial 60 has been changed (step S31). If the mode dial 60 has been changed, the program returns to the step S3 to check the dial status.

In contrast, as a result of the determination of the step S11, if the mode dial 60 has not been changed in step S11, the system control circuit 50 performs processing to continue the through image display. More specifically, using the image processing circuit 20, the system control circuit 50 performs predetermined photometric computations with respect to a video signal obtained from the image pickup device 14, and stores the results of the computations in the memory 30 (step S12). Based on these computational results, the system control circuit 50 performs AE processing with respect to the through image using the exposure control section 40. There-after, the system control circuit 50 displays the through image on the image display section 28 (step S13).

The system control circuit 50 then determines whether or not the shutter switch (SW1) 61 is pressed (step S14). When the shutter switch (SW1) 61 is not pressed, the program returns to the step S3 to check the dial status and battery status.

In contrast, when the shutter switch (SW1) 61 is pressed, the system control circuit 50 performs a predetermined distance-measuring calculation with respect to a video signal obtained from the image pickup device 14 by means of the image processing circuit 20, and stores the calculation result in the memory 30 (step S15). Subsequently, based on the distance-measuring calculation result, the system control circuit 50 performs AF processing using the distance measurement control section 44 to focus the photographing lens 10 on the subject (step S16). Thereafter, the system control circuit 50 displays a through image on the image display section 28 (step S16).

The system control circuit 50 then determines whether or not the shutter switch (SW2) 62 is pressed (step S17). When the shutter switch (SW2) 62 is not pressed, the system control circuit 50 again determines whether or not the shutter switch (SW1) 61 is pressed (step S18). When the shutter switch (SW1) 61 is pressed, the program returns to the step S16 to continue a holding state of the shutter switch SW1. In contrast, when the shutter switch (SW1) 61 is not pressed, the program returns to the step S3 to check the dial status and the battery status.

Further, as a result of the determination of the step S17, when the shutter switch (SW2) 62 is pressed, the system control circuit 50 executes a photographing process for a still image as described later with reference to FIG. 4 and FIG. 5, to store the compressed image data in the memory 30 (step S19).

The system control circuit 50 writes the compressed image data that is stored in the memory 30 in step S19 on the recording media 200 as a still image file (step S20). The system control circuit 50 then displays the image captured in the step S19 on the image display section 28 as a review image (step S21) to complete the photographing process for a still image.

Subsequently, the system control circuit 50 determines whether or not the shutter switch (SW1) 61 is pressed (step S22). When the shutter switch (SW1) 61 is pressed, the program returns to the step S16 to return to an imaging standby state with the through image displayed. In contrast, when the shutter switch (SW1) 61 is not pressed, the program returns to the step S3 to check the dial status.

Figure 4:
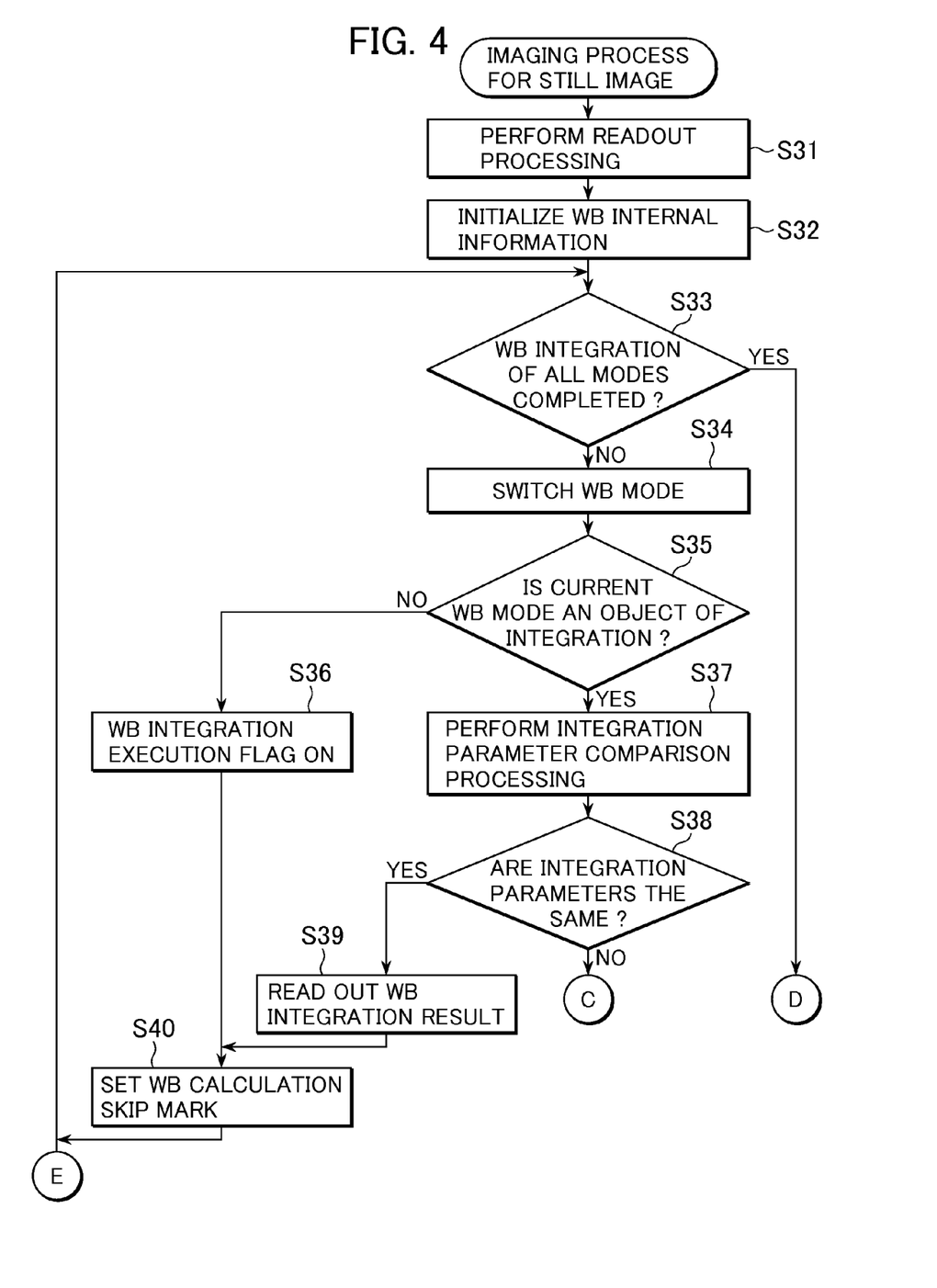
FIG. 4 is a flowchart showing the procedure of a photographing process for a still image executed at step S19 in FIG. 3.
Figure 5:
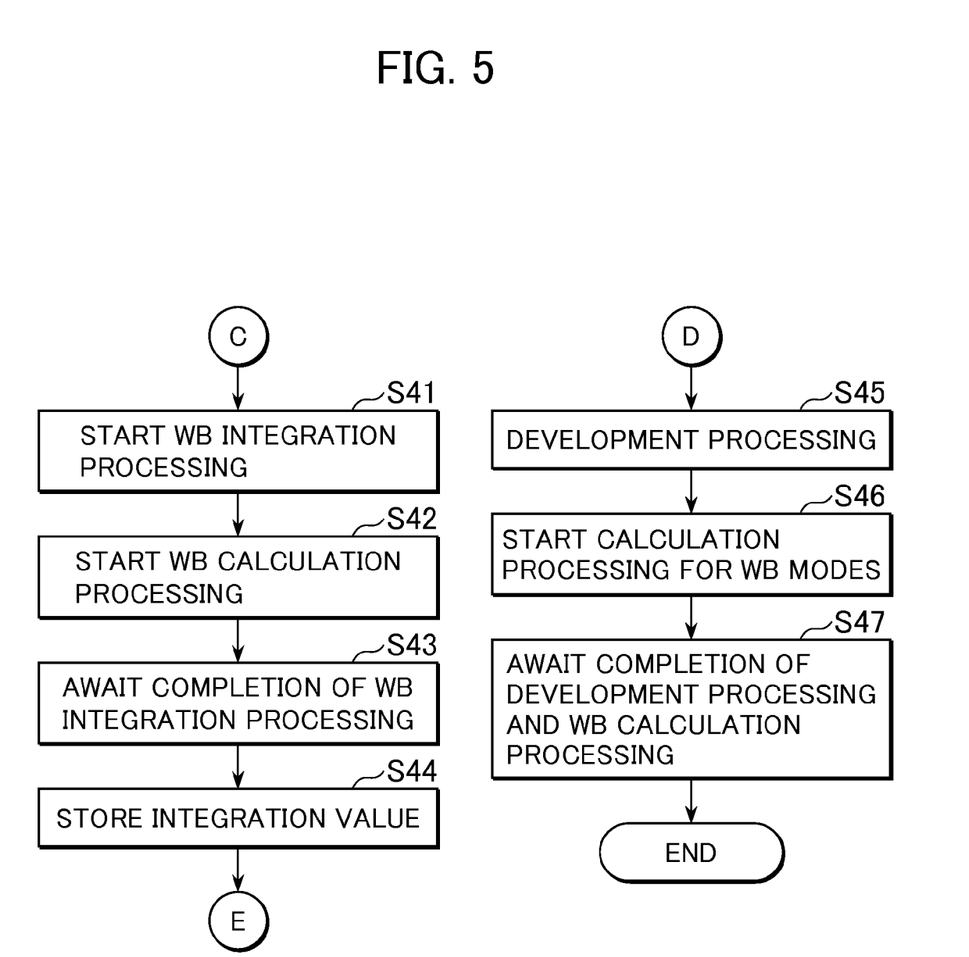
FIG. 5 is a flowchart showing the procedure of a photographing process for a still image executed at step S19 in FIG. 4.

FIG. 4 and FIG. 5 are flowcharts showing the procedure of a photographing process for a still image executed in step S19 in FIG. 3.

The system control circuit 50 reads out a video signal from the image pickup device 14 in synchronization with the timing generation circuit 18 (step S31). At this time, when the strobe light photographing is performed due to the AE processing in the step S12, the strobe light 48 emits light in synchronization with a front curtain or a rear curtain of a video signal. The video signal read out from the image pickup device 14 is converted into image data through the A/D converter 16 and stored in the memory 30.

The system control circuit 50 initializes white balance (hereinafter also referred to as "WB") work information (see FIG. 6) stored in the memory 30 (step S32).

The system control circuit 50 then determines whether or not the white balance processing (WB integration) of all the WB modes is completed (step S33). More specifically, the system control circuit 50 reads out the WB work information stored in the memory 30 and refers to a flag indicating the presence/absence of execution of processing for the white balance integration. When a WB integration execution flag is ON for all the WB modes, the system control circuit 50 assumes that the white balance processing is completed for all the WB modes, followed by the program proceeding to the step S45.

In contrast, as a result of the determination of the step S33, if the white balance processing (WB integration) for all the WB modes is not completed, the system control circuit 50 switches the WB mode (step S34). According to the present embodiment, eight kinds of modes are provided as the WB modes. These are: "auto", "sunlight", "cloudy", "electric bulb", "fluorescent (neutral white fluorescent lighting)", "fluorescent H (daylight fluorescent lighting)", "underwater", and "strobe light". The system control circuit 50 refers to the memory 30 to retrieve a WB mode for which WB integration processing has not been executed from the WB work information, and sets the WB mode in the memory 30.

Further, the system control circuit 50 sets integration parameters such as the integration range of white search integration that corresponds with the selected (set) WB mode in the image processing circuit 20 and also sets the integration parameters (setting values) in the WB work information stored in the memory 30. In this connection, the integration range for the white search integration will be described later with reference to FIG. 7.

The system control circuit 50 determines whether or not the WB integration is necessary for the WB mode that is set in the step S34 (step S35). According to the present embodiment, when the WB mode is "strobe light", the WB integration is not necessary. For the other WB modes, the WB integration is necessary.

As a result of the determination of the step S35, when the system control circuit 50 determines that the WB integration is not required in step S35, the system control circuit 50 sets the WB integration execution flag of the relevant WB mode in the WB work information stored in the memory 30 to "on" (step S36), subsequently, the system control circuit 50 sets a WB operation execution flag in the WB work information stored in the memory 30 to a skip status (step S40), followed by the program returning to the step S33.

In contrast, as a result of the determination of the step S35, when the system control circuit 50 determines that the WB integration is required, the system control circuit 50 performs processing of comparing the integration parameters (setting values) stored in the memory 30 in step S34 (step S37). More specifically, the system control circuit 50 compares the integration parameters corresponding to the current WB mode and the integration parameters corresponding to a WB mode for which WB integration was executed previously, to thereby determine whether or not the WB integration has already been executed for the same integration parameters.

The system control circuit 50 determines whether or not the same integration parameters are found by the processing of comparing the integration parameters in step S37 (step S38). When the same integration parameters are found, the program proceeds to the step S39 to omit the WB integration. In contrast, when the same integration parameters are not found, the program proceeds to the step S41 to perform the WB integration.

The processing of step S39 is performed in a case where it is determined that the WB integration is necessary (YES to the step S35) and the WB integration according to the same integration parameters has already been executed (YES to the step S38). The WB integration results corresponding to the WB modes are stored as the WB work information in the memory 30. The system control circuit 50 reads out from the memory 30 a WB integration result that corresponds to a WB mode having the same integration parameters that is found by means of the comparison result in step S37, and copies the WB integration result into a WB integration result region corresponding to the current WB mode (step S39), subsequently, the system control circuit 50 sets a WB operation execution flag in the WB work information stored in the memory 30 to a skip status (step S40), followed by the program returning to the step S33. A configuration may also be adopted in which the same processing is performed when approximately the same (close), but not identical, integration parameters are found.

When the WB integration is unnecessary (NO to the step S35) and the WB integration using the same integration parameters is already executed (YES to the step S38), the system control circuit 50 sets a WB operation execution flag in the WB work information stored in the memory 30 to a skip status (step S40), followed by the program returning to the step S33.

In contrast, the processing at step S41 is performed when the WB integration is necessary (YES to the step S35) and the WB integration using the same integration parameters is not executed (NO to the step S38). The system control circuit 50 instructs the signal processing circuit 20 to execute white search integration for the current WB mode to start the WB integration processing (step S41). At this time, the system control circuit 50 searches the WB work information, and when a WB integration execution flag is "off" for all the WB modes, the system control circuit 50 interprets that the current processing is the initial WB integration processing, and instructs the signal processing circuit 20 to also execute block integration when issuing the instruction to start the WB integration processing. This block integration is executed each time photographing is performed.

The system control circuit 50 starts WB calculation processing without waiting for completion of the WB integration processing (step S42). Thus, the system control circuit 50 executes WB calculation processing concurrently during the signal processing circuit 20 performing the WB integration processing that starts in the step S41.

The system control circuit 50 refers to the WB work information stored in the memory 30 to retrieve a WB mode for which the WB integration execution flag is "on" and the WB operation execution flag indicates an unexecuted state. If the system control circuit 50 finds a WB mode that matches these conditions, the system control circuit 50 executes predetermined WB calculation processing for the relevant WB mode. At this time, a white search integration value in accordance with the corresponding WB mode of the WB work information and a block integration value that is commonly stored for all the WB modes in the WB work information are used as the WB integration result utilized for WB calculation processing. By using the white search integration value and the block integration value, the WB integration value can be calculated precisely. When the system control circuit 50 ends the WB calculation processing, the system control circuit 50 sets the WB operation execution flag in accordance with the corresponding WB mode in the WB work information to a status that indicates that execution is completed, followed by the program proceeding to the step S43.

In contrast, when a WB mode for which the WB integration execution flag is "on" and the WB operation execution flag indicates an unexecuted state is not found, followed by the program proceeding to the step S43 without executing the WB calculation processing.

The system control circuit 50 waits for completion of the WB integration processing that is started at step S41 (step S43). The system control circuit 50 acquires the status of the signal processing circuit 20, and after the WB integration processing is completed, stores the WB integration result of the WB integration processing that starts in the step S41 (step S44), followed by the program returning to the step S33. More specifically, the system control circuit 50 copies the white search integration value that is being held at the signal processing circuit 20 into a region for a white search integration value corresponding to the current WB mode of the WB work information stored in the memory 30. Further, the system control circuit 50 searches the WB work information, and when a WB integration execution flag is "off" for all the WB modes, the system control circuit 50 interprets that the current processing is the initial WB integration processing and copies a block integration value being held in the signal processing circuit 20 into the WB work information.

In contrast, as a result of the determination of the step S33, if the white balance processing (WB integration) for all the WB modes is completed, the system control circuit 50 instructs the signal processing circuit 20 to start development processing (step S45). This development processing is a series of processes in which a predetermined developing and compression processing such as JPEG is performed, and the image data subjected to the processing is stored in the memory 30. The system control circuit 50 instructs the signal processing circuit 20 to perform the development processing, followed by the program proceeding to the step S46 without waiting for completion thereof.

After completion of WB integration processing for all WB modes, the system control circuit 50 refers to the WB work information that is stored in the memory 30 and starts WB calculation processing for all the WB modes for which the WB operation execution flag is set to "skip" (step S46). This WB calculation processing is executed by the system control circuit 50, and is executed concurrently during the development processing of the step S45.

The system control circuit 50 waits for completion of the development processing of the step S45 and the WB calculation processing of the step S46 (step S47). After the development processing and the WB calculation processing have been completed for all the WB modes, the system control circuit 50 stores the WB operation results for all the WB modes in a header region of the image data, followed by terminating the program.

Figure 6:
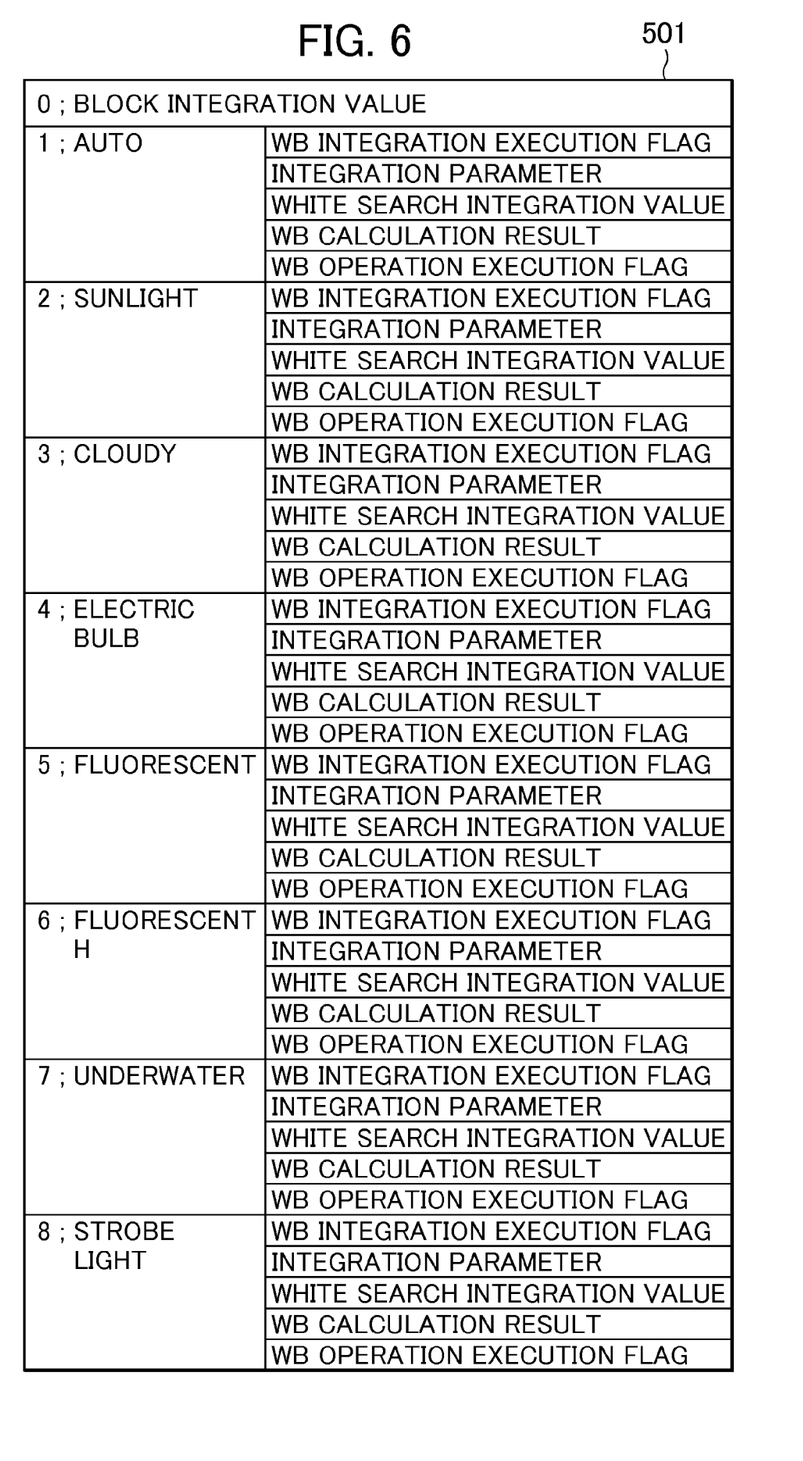
FIG. 6 is a table showing the format of white balance work information in a memory 30, that is initialized at step S32 shown in FIG. 4.

FIG. 6 is a table showing the format of the WB work information stored in the memory 30. As the WB work information, a block integration value is stored commonly for all the WB modes, and thus an integration value according to block integration can be commonly used for all the WB modes. A storage region for a WB integration execution flag, integration parameters, a white search integration value, a WB operation result, and a WB operation execution flag is reserved for each of the WB modes.

The WB integration execution flag is "off" when the WB integration is unexecuted, and is "on" when WB integration has been executed. The integration parameters are setting values when performing white search integration at the signal processing circuit 20. A black-body radiation curve and regions in the vicinity thereof as described later and threshold values and the like used when performing the integration processing are included as setting values in the integration parameters.

Figure 7:
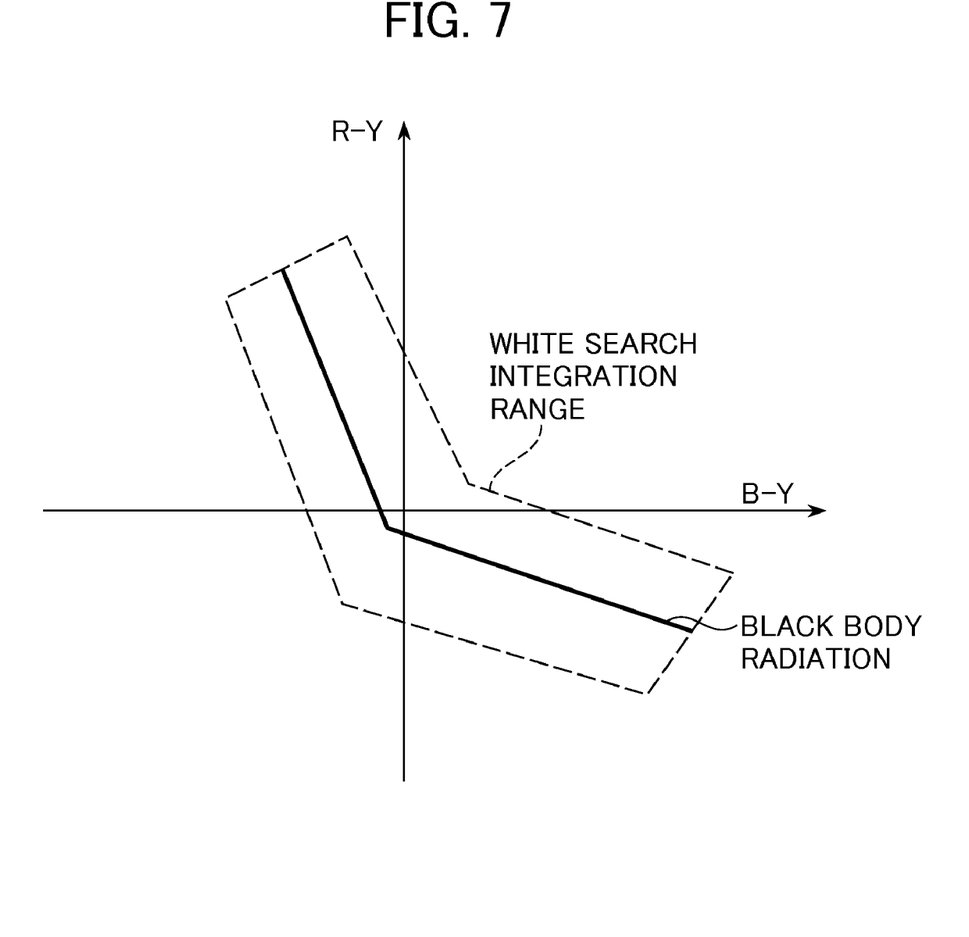
FIG. 7 is a view showing an integration target range of white search integration according to a WB mode that is switched in step S34 in FIG. 4.

FIG. 7 is a view showing a black-body radiation curve and peripheral regions thereof on chromaticity coordinates as an integration target range of white search integration. The system control circuit 50 sets the black-body radiation curve and peripheral (neighboring) regions thereof on the chromaticity coordinates as shown in FIG. 7 as an integration target range of white search integration in the signal processing circuit 20. The result of white search integration by the signal processing circuit 20 is stored in a white search integration value. The white search integration value is an integration value of color signals for an integration target region on the chromaticity coordinates. The WB operation result is stored as a result obtained upon executing a predetermined white balance calculation processing using the white search integration value and the block integration value. The WB operation result (WB control value) includes the color temperature of the light source and a color gain of each color for adjusting the color balance in accordance with the light source, as information for correcting the color temperature of the light source. The WB operation execution flag is set in one of the following three states: an unexecuted state that is set in a case where the WB calculation processing has not been executed, a skip state that is set in a case where the WB calculation processing is to be performed later, and an executed state that is set in a case where the WB calculation processing is completed.

Figure 8:
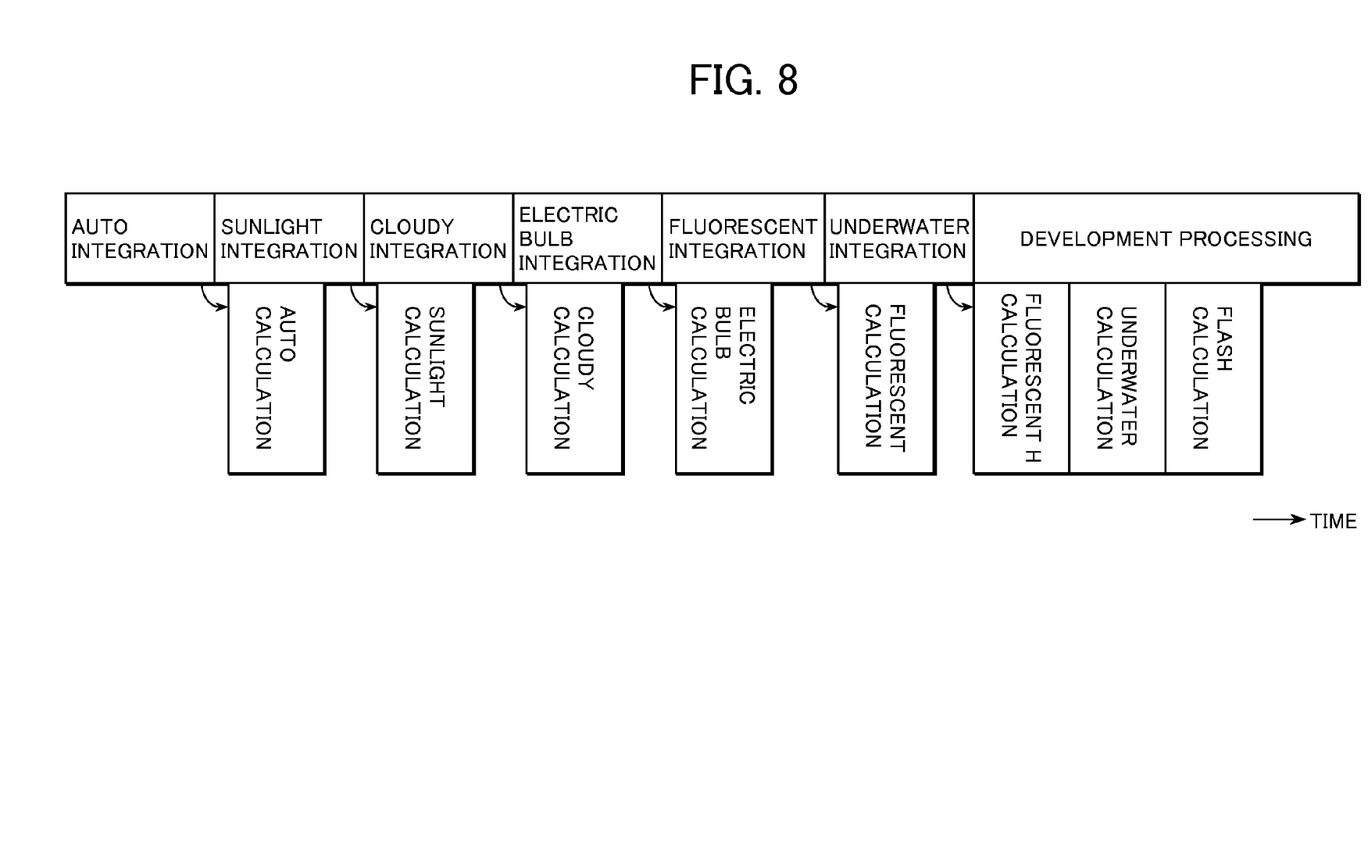
FIG. 8 is a timing chart showing integration processing and calculation processing for white balance adjustment along a time axis.

FIG. 8 is a timing chart showing the integration processing and the calculation processing for the white balance adjustment as described with reference to FIG. 4 and FIG. 5 along a time axis. The WB integration is executed in the order of "auto", "sunlight", "cloudy", "electric bulb", "fluorescent", and "underwater". The development processing starts as soon as each WB integration process is completed. The WB integration is not required for "fluorescent H" mode, and the WB integration value of "fluorescent" mode is used therefor. "Strobe light" is assumed to be a mode for which the WB integration is unnecessary, and the WB integration processing is thus omitted. The WB calculation processing is executed concurrently during the WB integration processing. Further, the overall processing time is reduced by executing the WB calculation processing concurrently during the development processing. In a case in which the white balance processing is to be executed for all the WB modes, the processing time can be reduced by executing the WB integration processing and the WB calculation processing concurrently (parallelly), and omitting the WB integration processing when the integration parameters are identical with or close to each other.

According to the image pickup apparatus of the present embodiment, when adjusting the white balance in image correction processing for the development processing of the raw data, it is possible to eliminate the need for performing the WB integration processing and the calculation processing to significantly reduce the processing time, even if the white balance adjustment is set to an arbitrary mode.

Further, since it is no longer necessary to perform the integration processing and the calculation processing of the white balance adjustment in the development processing of the raw data, thereby reducing the overall circuit scale of the development processing or the size of the program code, which simplifies the configuration.

Further, for an image pickup apparatus having an image pickup function of the raw data, when image data subjected to the development processing at the image pickup apparatus main unit is compared with image data obtained by the development processing of the raw data after photographing, the processing and the results relating to the white balance adjustment can be made the same, thereby improving the color reproduction properties.

In this connection, according to the present embodiment, a case was described in which the processing time can be reduced by omitting the WB integration processing of the "fluorescent H" mode; however, a WB mode for which the WB integration processing may be omitted is not limited thereto.

Further, although the WB mode "strobe light" is also described as a WB mode for which WB integration processing is unnecessary, a WB mode for which the WB integration processing is unnecessary is not limited thereto. In a case where the white balance processing can be executed without executing the WB integration processing by using a white balance algorithm, the WB integration processing can also be omitted for other WB modes.

According to the present embodiment, the white balance processing is executed in the order of "auto", "sunlight", "cloudy", "electric bulb", "fluorescent", "fluorescent H", "underwater", and "strobe light". However, the present embodiment is not limited thereto, and it is also possible to change the order to reduce the processing time.

Further, according to the present embodiment, the WB calculation processing is executed only once during the WB integration processing; however, when there is a time to execute the WB calculation processing plural times within the period of time taken for the WB integration processing, a plurality of kinds of the WB calculation processing may be executed.

Furthermore, in a case where a setting value as a white balance value is not changed irrespective of the white balance mode, the setting value may be determined one time commonly for all the white balance modes, to thereby facilitate setting of the integration parameters.

The present invention is not limited to the configuration of the above described embodiment, and any configuration can be applied as long as the configuration can accomplish the functions described in the attached claims or the functions of the configuration of the present embodiment.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a non-volatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-207027 filed Aug. 8, 2007, which is hereby incorporated by reference herein in its entirety.

What is claimed is:

1. An image pickup apparatus having a plurality of white balance modes, comprising:
an image pickup unit adapted to capture images of a subject to obtain a video signal;
an integration unit adapted to perform integration processing of the video signal obtained by said image pickup unit, based on a set integration parameter, to acquire a white balance integration value for each of the white balance modes;
a calculation unit adapted to perform calculation processing using the white balance integration value acquired by said integration unit to calculate a white balance control value for correcting a color temperature of a light source;
a storage unit adapted to store, for each of the white balance modes, the set integration parameter, the white balance integration value, corresponding to the set integration parameter, acquired by said integration unit, and the white balance control value calculated by said calculation unit,
wherein said storage unit stores at least a first white balance integration value in association with a first integration parameter corresponding to a first light source;
a comparison unit adapted to compare a second integration parameter to be set corresponding to a second light source different from the first light source with the first integration parameter stored in said storage unit; and
a readout unit adapted to, in a case where a result of the comparison indicates that the second integration parameter to be set is identical with or close to the first integration parameter stored in said storage unit, read out the first white balance integration value corresponding to the first integration parameter from said storage unit,
wherein said calculation unit is adapted to, in a case where the result of the comparison indicates that the second integration parameter to be set is identical with or close to the first integration parameter stored in said storage unit, calculate a second white balance control value using the read out first white balance integration value, without performing the calculation processing for obtaining a second white balance integration value using the second integration parameter.

2. An image pickup apparatus according to claim 1, wherein said integration unit is adapted to perform the integration processing as block integration of dividing the video signal into a plurality of blocks to acquire an integration value of a color signal of each of the blocks and white search integration of expanding a signal value of each of pixels of the video signal on chromaticity coordinates to acquire an integration value of a color signal for a predetermined region represented by the integration parameter, and said integration unit is adapted to perform the white search integration for each of the white balance modes and perform the block integration each time photographing is performed.

3. An image pickup apparatus according to claim 2, wherein said storage unit has a storage region holding a single integration value acquired by the block integration.

4. An image pickup apparatus according to claim 2, wherein the integration parameter includes, as setting values, a black-body radiation curve in the white search integration as well as neighboring regions thereof and a threshold value used when performing the integration processing, and the setting values are commonly determined one time only for all the white balance modes, in a case where the setting values are not changed regardless of the white balance mode.

5. An image pickup apparatus according to claim 1, wherein said calculation unit is adapted to perform the calculation processing concurrently during the said integration unit performing the integration processing.

6. An image pickup apparatus according to claim 1, further comprising:
  a development unit adapted to perform development processing after said integration unit has completed the integration processing,
  wherein said development unit is adapted to perform the development processing concurrently during the calculation unit performing the calculation processing.

7. An image pickup apparatus according to claim 1, wherein repeating the integration processing by said integration unit and the calculation processing by said calculation unit causes a white balance control value corresponding to the plurality of white balance modes to be calculated.

8. An image pickup apparatus according to claim 1, further comprising a setting unit for setting the integration parameter.

9. A white balance control method for an image pickup apparatus having a plurality of white balance modes and a storage unit, the method comprising:
  an image pickup step of capturing images of a subject to obtain a video signal;
  an integration step of performing integration processing of the video signal obtained in said image pickup step, based on a set integration parameter, to acquire a white balance integration value for each of the white balance modes;
  a calculation step of performing calculation processing using the white balance integration value acquired in said integration step to calculate a white balance control value for correcting a color temperature of a light source;
  a storage step of storing in the storage unit, for each of the white balance modes, the set integration parameter, the white balance integration value, corresponding to the set integration parameter, acquired in said integration step, and the white balance control value calculated in said calculation step,
  wherein the storage unit stores at least a first white balance integration value in association with a first integration parameter corresponding to a first light source;
  a comparison step of comparing a second integration parameter to be set corresponding to a second light source different from the first light source with the first integration parameter stored in said storage step; and
  a readout step of, in a case where a result of the comparison indicates that the second integration parameter to be set is identical with or close to the first integration parameter stored in said storage step, reading out the first white balance integration value corresponding to the first integration parameter stored in said storage step,
  wherein said calculation step, in a case where the result of the comparison indicates that the second integration parameter to be set is identical with or close to the first integration parameter stored in the storage unit, calculates a second white balance control value using the read out first white balance integration value, without performing the calculation processing for obtaining a second white balance integration value using the second integration parameter.

10. A method according to claim 9, wherein the method further comprises a setting step of setting the integration parameter.

11. A non-transitory computer-readable storage medium storing a computer program executable by a processor of an image pickup apparatus having a plurality of white balance modes and a storage unit, to execute a white balance control method comprising:
  an image pickup step of capturing images of a subject to obtain a video signal;
  an integration step of performing integration processing of the video signal obtained in said image pickup step, based on a set integration parameter, to acquire a white balance integration value for each of the white balance modes;
  a calculation step of performing calculation processing using the white balance integration value acquired in said integration step to calculate a white balance control value for correcting a color temperature of a light source;
  a storage step of storing in a storage unit, for each of the white balance modes, the set integration parameter, the white balance integration value, corresponding to the set integration parameter, acquired in said integration step, and the white balance control value calculated in said calculation step,
  wherein the storage unit stores at least a first white balance integration value in association with a first integration parameter corresponding to a first light source;
  a comparison step of comparing a second integration parameter to be set corresponding to a second light source different from the first light source with the first integration parameter stored in said storage step; and
  a readout step of, in a case where a result of the comparison indicates that the second integration parameter to be set is identical with or close to the first integration parameter stored in said storage step, reading out the first white balance integration value corresponding to the first integration parameter stored in said storage step,
  wherein said calculation step, in a case where the result of the comparison indicates that the second integration parameter to be set is identical with or close to the first integration parameter stored in the storage unit calculates a second white balance control value using the read out first white balance integration value, without performing the calculation processing for obtaining a second white balance integration value using the second integration parameter.

12. A non-transitory computer-readable storage medium according to claim 11, wherein the method further comprises a setting step of setting the integration parameter.

* * * * *